(12) United States Patent
Crowley et al.

(10) Patent No.: US 11,993,985 B2
(45) Date of Patent: May 28, 2024

(54) DOWNHOLE ASSEMBLY TO MITIGATE HIGH FREQUENCY TORSIONAL OSCILLATION, AND OSCILLATION MITIGATION TOOL SUITABLE FOR USE IN A DOWNHOLE ASSEMBLY

(71) Applicant: ROCKATEK LIMITED, Gloucester (GB)

(72) Inventors: Daniel Brendan Crowley, Gloucester (GB); Robert Donald John Sedgeman, Gloucester (GB)

(73) Assignee: ROCKATEK LIMITED, Gloucester (GB)

( * ) Notice: Subject to any disclaimer, the term of this patent is extended or adjusted under 35 U.S.C. 154(b) by 0 days.

(21) Appl. No.: 18/550,122

(22) PCT Filed: Mar. 10, 2022

(86) PCT No.: PCT/EP2022/056245
§ 371 (c)(1),
(2) Date: Sep. 11, 2023

(87) PCT Pub. No.: WO2022/189586
PCT Pub. Date: Sep. 15, 2022

(65) Prior Publication Data
US 2024/0084651 A1      Mar. 14, 2024

(30) Foreign Application Priority Data
Mar. 10, 2021   (GB) ..................................... 2103282

(51) Int. Cl.
*E21B 17/07*      (2006.01)

(52) U.S. Cl.
CPC .................................. *E21B 17/073* (2013.01)

(58) Field of Classification Search
CPC ......... E21B 17/05; E21B 17/073; E21B 17/07
See application file for complete search history.

(56) References Cited

U.S. PATENT DOCUMENTS

| 7,044,240 B2 | 5/2006 | McNeilly | |
| 7,219,752 B2 * | 5/2007 | Wassell | .................. E21B 44/00 |
| | | | 175/57 |

(Continued)

FOREIGN PATENT DOCUMENTS

| EP | 1024245 A2 | 8/2000 |
| WO | 2004090278 A1 | 10/2004 |
| WO | 2019232006 A1 | 12/2019 |

OTHER PUBLICATIONS

International Preliminary Report on Patentability issued in PCT/EP2022/056245 dated Jan. 26, 2023 (8 pages).

*Primary Examiner* — Shane Bomar
(74) *Attorney, Agent, or Firm* — ARC IP Law, PC; Joseph J. Mayo (57) ABSTRACT

A downhole assembly to mitigate high frequency torsional oscillation, in particular the high frequency torsional oscillation which can occur in a drilling operation for geothermal energy or for oil and gas. The downhole assembly has a rotary steerable tool and a high frequency torsional oscillation mitigation tool, the high frequency torsional oscillation mitigation tool having a one-way coupling, the high frequency torsional oscillation mitigation tool being located above the rotary steerable tool. Also relates to an oscillation mitigation tool suitable for use in a downhole assembly.

21 Claims, 8 Drawing Sheets

(56) References Cited

U.S. PATENT DOCUMENTS

| | | | |
|---|---|---|---|
| 7,377,337 B2 | 5/2008 | Swietlik et al. | |
| 7,654,344 B2 | 2/2010 | Haughom et al. | |
| 8,739,901 B2* | 6/2014 | Cote | E21B 7/24 175/57 |
| 10,253,584 B2 | 4/2019 | Crowley et al. | |
| 2003/0024742 A1* | 2/2003 | Swietlik | E21B 17/05 175/325.1 |
| 2004/0238219 A1 | 12/2004 | Nichols et al. | |
| 2015/0176344 A1* | 6/2015 | McLoughlin | E21B 17/076 175/24 |
| 2015/0226020 A1* | 8/2015 | Crowley | E21B 47/12 175/74 |
| 2017/0030149 A1 | 2/2017 | Kadam et al. | |
| 2018/0100357 A1* | 4/2018 | Christopher | E21B 17/028 |
| 2019/0284882 A1 | 9/2019 | Peters et al. | |
| 2020/0018124 A1* | 1/2020 | Hohl | E21B 17/1042 |
| 2021/0348452 A1* | 11/2021 | Brooks | E21B 10/20 |

* cited by examiner

DOWNHOLE ASSEMBLY TO MITIGATE HIGH FREQUENCY TORSIONAL OSCILLATION, AND OSCILLATION MITIGATION TOOL SUITABLE FOR USE IN A DOWNHOLE ASSEMBLY

FIELD OF THE INVENTION

The invention relates to a downhole assembly (or bottom hole assembly) to mitigate high frequency torsional oscillation, in particular the high frequency torsional oscillation which can occur in a drilling operation for geothermal energy or for oil and gas. The downhole assembly has a rotary steerable tool by which the drill bit can be steered in a chosen direction.

The invention also relates to an oscillation mitigation tool suitable for use in a downhole assembly.

In this application directional and orientational terms such as "top", "bottom", "below" etc. refer to the downhole assembly and tool in use in a substantially vertical borehole. The use of these directional terms does not preclude the downhole assembly being used in non-vertical boreholes.

BACKGROUND TO THE INVENTION

When drilling for geothermal energy or for oil and gas, the drill bit is connected to surface equipment by way of a drill string. The drill string is hollow whereby drilling fluid or mud can be pumped down the borehole, the mud acting to lubricate the drill bit and to carry drill cuttings back to the surface. The mud and entrained drill cuttings return to the surface along the outside of the drill string, the drill string being smaller than the diameter of the borehole.

In some drilling applications the drill string is rotated at the surface, with the rotation being communicated to the drill bit by the drill string. In other drilling applications a downhole motor such as a mud motor is provided, which uses the flowing mud to drive the drill bit to rotate. A downhole motor may be used with a rotating, or a non-rotating, drill string.

Some downhole motors include a bent housing and are used to steer the drill bit, the bent housing being connected to the drill string. The downhole assembly includes sensors to determine the orientation of the bend in the housing and thereby the orientation of the drill bit (below the motor) relative to the drill string (above the motor). If the orientation matches that in which it is desired to drill the motor drives the drill bit to rotate and the borehole will curve in the direction determined by the bent housing. When it is desired to change the direction of drilling the drill string and housing are rotated until the orientation of the bend matches the required new orientation. When it is desired to drill a linear section of borehole the drill string and housing are continuously rotated to cancel out the effect of the bend.

Downhole motors are relatively crude and are largely being replaced by rotary steerable tools such as that described in EP 1 024 245. As above indicated, the drill string is smaller than the diameter of the borehole and is typically centralised in the borehole. The rotary steerable tool of EP 1 024 245 is located close to the drill bit and has radial pistons which can be actuated to force the drill string away from the centre of the borehole, and thereby force the drill bit to deviate from a linear path. Rotary steerable tools can be used with rotating drill strings which permit the drilling of much deeper boreholes than non-rotating drill strings. Rotation of the drill string requires the pistons to be actuated cyclically to match the rotation of the drill string.

In addition to the torque which rotates the drill bit there is also a force acting to advance the bit into the rock at the bottom end of the borehole, the latter force typically being referred to as "weight on bit". The weight on bit is determined by the surface equipment and is dependent amongst other things upon the weight of the drill string and the inclination of the borehole.

High frequency torsional oscillation is one of the torsional dynamics phenomena which are known to occur downhole and which can damage parts of the downhole assembly. The other well-known torsional dynamics phenomena are stick-slip and low frequency torsional oscillation. Stick-slip and low frequency torsional oscillation are both understood to occur typically at less than 2 Hz (approx.), whereas high frequency torsional oscillations are understood to occur typically at between 50 and 500 Hz (approx.).

The drill operator will usually seek to maximise the weight on bit so that the drill advances as quickly as possible through the rock. However, there is a maximum limit for the weight on bit which depends upon the bit design and the drilling conditions. Exceeding the maximum weight on bit for the particular bit design and drilling conditions will increase the drag upon the drill bit and cause the drill bit to slow down or stall.

If the drill bit rotates more slowly than the drill string, or more slowly than the output of the downhole motor, then the drill string will be caused to twist as torque output from the surface equipment (or downhole motor) increases in response to maintain the original rate of rotation. Eventually, torque at the drill bit will exceed the resistance to rotation and the rate of rotation of the drill bit will increase.

This is the phenomenon known as stick-slip and in some cases this includes the drill bit temporarily stalling. Drill operators seek to avoid stick-slip by reacting to reductions in the rate of rotation of the drill bit by reducing the weight on bit, so that the drill bit resumes its desired rate of rotation quickly without excessive twisting of the drill string. Torque control devices which can automatically reduce the weight on bit if the torque exceeds a certain threshold are known, for example WO 2004/090278 (Tomax), U.S. Pat. No. 7,044,240 (McNeilly), U.S. Pat. No. 7,654,344 (Tomax), and U.S. Pat. No. 10,253,584 (Crowley/Walker).

Low frequency and high frequency torsional oscillations differ from stick-slip and are both types of resonance in the drill string. Low frequency torsional oscillation is rarely damaging to a downhole assembly and the present invention is not concerned with that aspect of torsional dynamics.

All systems have resonant frequencies and high frequency torsional oscillation usually comprises torsional resonance in the downhole assembly and drill string at one or more harmonics. High frequency torsional oscillation is typically the most damaging form of torsional dynamics and is understood to be particularly prevalent when drilling through hard carbonate formations. The high frequency torque and RPM fluctuations are often attenuated as they travel up the drill string and are often not measurable at the surface. Downhole sensors are therefore usually required to provide real-time information, without which the high frequency torsional oscillation can quickly cause extensive damage including premature failure of the downhole assembly, including in particular damage to a rotary steerable tool and to polycrystalline diamond compact (PDC) drill bits.

It is possible to damp or otherwise mitigate resonance if the resonant frequency is known; however, in practice there is a difference between the theoretical natural frequency of the system and the real-life damped natural frequency of the system. Furthermore, there is the added complication that some instances of high frequency torsional oscillation arise in response to a single stimulus whereas others arise in response to a continual periodic stimulus.

A further complication in a downhole drilling application is that the "system" comprises the drill string and the downhole assembly (which can both be well-modelled) and also the formation borehole, the drilling fluid and the influence of (non-obvious) external parameters such as weight on bit. These latter influences typically cannot be well-modelled and they significantly complicate the theory and calculations needed to characterize (and therefore damp or otherwise mitigate) the resonance.

The most basic model to explain torsional resonance behaviour has a single degree of freedom, for example a disc on a shaft, the shaft being supported at one of its ends. As the disc oscillates following a single induced rotational stimulus in which the shaft is twisted to a chosen degree, energy is transferred between potential energy stored in the twisted shaft and kinetic energy of the rotating disc and shaft. In a practical situation there are losses associated with the system such as hysteresis in the material and viscous drag against the fluid surrounding the system. These losses result in damping that causes the amplitude of the oscillations to reduce. Calculations to determine the natural frequency for such a basic system are relatively straightforward, even for shafts of varying cross sections and varying material stiffnesses and densities.

A development of this basic model is to change to a "forced" vibration system. In this case, repeated stimuli are applied to the system at or close to the resonant frequency. If the input force exceeds the damping the degree of twist in the shaft increases with every cycle. In this case the system will continue to oscillate and the amount of twist (and associated stresses) will increase until some form of failure occurs or the stimulus is removed (or its frequency changes).

With the increasing application of rotary steerable tools and a desire to drill ever faster, downhole assemblies are becoming more mechanically complex and more sensitive to adverse events downhole, such as in particular the damaging effects of high frequency torsional oscillation. There is also a general increase in the depth (length) of boreholes, with the result that there is a greater length of drill string which can twist and store potential energy; the increased potential energy can be transferred into an increased amount of kinetic energy and thereby increase the likelihood of damage to the drill string and/or downhole assembly.

There is also competition driving down costs and increasing the required rate of penetration (ROP) for a drilling operation, with the result that rotary steerable tools are now operating in environments, and under performance drilling parameters, that ultimately mean that the tools must be able to withstand some or all of the extreme power dissipated in the downhole assembly during high frequency torsional oscillation.

SUMMARY OF THE INVENTION

It is an object of the present invention to mitigate the damaging effects of high frequency torsional oscillations in a downhole assembly, in particular during drilling for geothermal energy or for oil and gas. It is known to use torque limiting tools such as those of Tomax and others as described above in a downhole assembly. The present invention differs from this approach as it functions independently of weight on bit and drilling torque.

According to the invention there is provided a downhole assembly including a rotary steerable tool and a high frequency torsional oscillation mitigation tool, the high frequency torsional oscillation mitigation tool having a one-way coupling, the high frequency torsional oscillation mitigation tool being located above the rotary steerable tool.

Alternatively stated, the rotary steerable tool is located between the drill bit and the high frequency torsional oscillation mitigation tool.

The one-way coupling communicates input rotation from the drill string above the mitigation tool to output rotation of the steering tool (and drill bit) below the mitigation tool in a non-uniform manner dependent upon the direction of rotation.

Preferably, the high frequency torsional oscillation mitigation tool has a first end and a second end. Desirably there is a first connector at the first end and a second connector at the second end, the connectors being provided for the releasable connection of the mitigation tool to other components of the downhole assembly (including for example the rotary steerable tool). In a typical application the first and second connectors are pin connectors or box connectors of standardised form.

Preferably, the one-way coupling has a first part and a second part. The one-way coupling has an engaged condition in which the first part and the second part can rotate together and a disengaged condition in which the first part can rotate relative to the second part. Ideally, the one-way coupling communicates 100% of input rotation from the first end to the second end (i.e. without any loss) in a first rotational direction. Ideally also the one-way coupling communicates 0% of the input rotation from the first end to the second end (i.e. zero output rotation) in a second rotational direction opposed to the first direction. In most practical applications, however, it is expected that there may be some transfer of input rotation to output rotation in the second rotational direction, albeit with reduced torque capability. Nevertheless, it will be understood that the transfer of kinetic energy during high frequency torsional oscillation from the drill string and/or from the uphole parts of the downhole assembly to the steering tool will be significantly altered by the presence of a one-way coupling which avoids (or at least significantly reduces) the transfer of rotation in the second rotational direction.

It is expected that the one-way coupling will act to prevent the onset of damaging high frequency torsional oscillation by preventing the kinetic energy of those oscillations being communicated throughout the downhole assembly, and in turn preventing the build-up of potential energy. However, even if a proportion of the kinetic energy is transferred, it is expected to be sufficiently reduced to avoid damage to the downhole assembly and in particular to avoid damage to the rotary steerable tool.

It will be understood that the first rotational direction corresponds to the normal direction of rotation of the drill string (i.e. clockwise when viewed in the downhole direction towards the drill bit) whereby the normal rotation of the drill string can be communicated to the rotary steerable tool and to the drill bit.

The one-way coupling will be effective whether the high frequency torsional oscillation is generated at the drill bit (i.e. below the mitigation tool) or in the drill string or uphole parts of the downhole assembly (i.e. above the mitigation tool). In both cases, because the one-way coupling lies within the resonant system it will reduce the likelihood of high frequency torsional oscillation which is generated at the drill bit passing to the uphole parts of the downhole assembly and drill string where it can build up to damaging levels, and it will reduce the likelihood of any damaging high frequency torsional oscillation which has built up in the downhole assembly or drill string from passing to the rotary steerable tool. Whilst high frequency torsional oscillation can in principle be generated throughout the system it is likely to be the downhole assembly where the resonance will cause the build-up of energy to damaging levels for the high value parts of the assembly such as rotary steerable systems and logging while drilling tools.

It is understood that the top of the downhole assembly is a typical reflection point for high frequency torsional strain waves. Also, the length of the downhole assembly is directly related to the resonant frequency of the system. Because the high frequency torsional oscillation mitigation tool is located in the downhole assembly it is understood that activation of the tool significantly alters the boundary conditions of the resonant system and in doing so significantly interrupts the transfer and reflection of torsional strain.

The one-way coupling may comprise a one-way clutch, a sprag clutch, a sprag bearing, an over-run clutch, an over-run bearing, a ratchet bearing, a ratchet clutch, a roller clutch, a pawl bearing, a freewheel clutch or a pawl clutch. Whilst some of these terms are synonymous, and there is some overlap between certain of these devices, they all operate in similar ways to permit relative rotation in one rotational direction (whereby to transfer little or no input rotation to output rotation) and to avoid relative rotation in the other rotational direction (whereby to transfer most or all input rotation to output rotation). The detailed structure of the one-way coupling is incidental to many embodiments of the present invention and many different detailed structures could be used in a practical tool depending upon the characteristics of the downhole assembly (and the above list of one-way couplings is not exhaustive).

A one-way coupling (or freewheel clutch) is known to be used in a downhole application as described in U.S. Pat. No. 7,377,337. The freewheel clutch is located between a downhole motor and the drill bit, the downhole motor being connected to a rotating drill string. The clutch is normally disengaged and allows the drill bit to rotate at a faster rate than the drill string, the drill bit being driven by the rotating output shaft of the downhole motor (in addition to the rotating drill string). If, however, the drill bit slows or stalls the downhole motor will similarly slow or stall. As soon as the rate of rotation of the drill bit drops below the rate of rotation of the drill string the clutch engages and the drill bit is driven to rotate by the drill string (the drill string being able to deliver significantly more torque than the downhole motor).

The present invention in certain aspects is distinguished from U.S. Pat. No. 7,377,337 in that it is used with a rotary steerable tool and is located above the rotary steerable tool. The mitigation tool is also distinguished in that it is normally engaged, i.e. the one-way coupling communicates normal rotation of the drill string to the steering tool and drill bit; the one-way coupling is only disengaged during a high frequency torsional oscillation event, and for rotations in one direction. It will be understood that the one-way coupling typically wastes less energy when it is engaged than when it is disengaged; when it is disengaged waste heat is generated in the relatively rotating components of the coupling and it is generally preferable for the one-way coupling to be engaged (i.e. without any relatively-rotating components) during normal operation. The one-way coupling also suffers less wear if there is no relative rotation of its components in normal operation.

The present invention is also distinguished from U.S. Pat. No. 7,377,337 in that it does not require a downhole motor. A downhole motor comprises a rotor and a stator. The rotor and stator are rotationally interconnected only by the downhole fluid within the motor and there is no fixed rotational mechanical connection between these components. As described above, U.S. Pat. No. 7,377,337 operates as the drill bit slows or ultimately stalls. The maximum torque which can be transmitted from the drill string to release a stalled (or stuck) drill bit is limited by the downhole motor and will reduce over time due to wear of the components. A direct mechanical connection between the drill string and the drill bit as provided by the one-way coupling of the present invention is significantly better suited to releasing a stuck drill bit.

The high frequency torsional oscillation mitigation tool can be lubricated by oil, by the downhole fluid (mud), or by a combination of these. In one embodiment the one-way coupling and the associated bearings are lubricated by oil. In another embodiment the one-way coupling and the bearings are lubricated by downhole fluid. In yet another embodiment the one-way coupling is lubricated by oil and the bearings are lubricated by downhole fluid.

In embodiments using downhole fluid as a lubricant a fluid conduit connects the relatively rotating parts of the tool to the mud flowing down the centre of the tool. In embodiments using oil the oil is isolated from the mud and the tool preferably includes a flow restrictor to reduce the local mud pressure and a pressure equaliser or compensator, suitably a sliding piston, to equalise (or at least substantially equalise) the pressure of the oil with the pressure in the surrounding mud.

Radial bearings are preferably located above and below the one-way coupling. Needle roller bearings are preferably used if lubricated by oil. Thin-walled tungsten carbide sleeves such as those typically used in downhole motors are preferably used if lubricated by downhole fluid.

Axial bearings are preferably located below the one-way coupling. Cylindrical roller thrust bearings are preferably used if lubricated by oil. Ball bearing stacks are preferably used if lubricated by downhole fluid.

The downhole assembly can if desired include two high frequency torsional oscillation mitigation tools, one located above (uphole of) and one located below (downhole of) the rotary steerable tool. The use of two mitigation tools gives the capability of changing the boundary conditions of the torsional resonance behaviour at two locations. The uphole high frequency torsional oscillation mitigation tool can isolate the rotary steerable tool and drill bit from the drill string; the downhole high frequency torsional oscillation mitigation tool can isolate the rotary steerable tool and drill string from the drill bit.

The one-way coupling can comprise a central body or shaft carrying a number of rollers or rods of circular cross-section, each of the rollers being located in a radial recess of the shaft. The floor of each recess is preferably inclined from a radially shallower end to a radially deeper end. The depth of the recess at the shallower end is less than the diameter of the roller whereby the roller projects from the recess. The shaft is preferably surrounded by a sleeve and it is arranged that when the roller is at the shallower end it engages the sleeve and drives the sleeve to rotate with the shaft. When located at the deeper end of the recess, however, the roller does not engage the sleeve and rotation of the shaft is not communicated to the sleeve. In such embodiments the rollers move outwardly into their engaged condition in which the coupling communicates rotation. In an alternative embodiment the recesses are formed in the surrounding sleeve and the rollers move inwardly to engage the central shaft in their engaged condition.

Preferably, the first and second parts of one-way coupling are separated in a radial direction (relative to the longitudinal axis of the high frequency torsional oscillation mitigation tool). Preferably there is a radial gap between the first part and the second part (e.g. between the shaft and the sleeve); a radial gap reduces or prevents the frictional losses which would occur if the first and second parts have cooperating sliding surfaces.

The depth of the recess at the deeper end is preferably greater than the diameter of the roller. It is nevertheless possible for the depth at the deeper end to be less than the diameter of the roller provided that there is a radial gap between the shaft and the sleeve and the roller does not project far enough from the recess to span the radial gap.

Preferably, there is a resilient biasing means engaging the roller and urging the roller towards the shallower end of the recess. The one-way coupling is therefore resiliently biased to its engaged condition. It is arranged that rotation of the body relative to the sleeve (in the second direction) causes the rollers to move to the deeper end of their respective recesses and to overcome the resilient biasing means.

The resilient biasing means is preferably a cantilever spring but the invention can alternatively utilise a canted spring, an elastomer, or a bent metal (e.g. accordion) spring for example. It will be understood that the rollers are typically of significant length so that they can accommodate the torque during a typical drilling operation (perhaps being around 400 mm to 600 mm long in practical tools). Alternatively each roller may comprise a set of aligned shorter roller elements. It is preferable that the resilient biasing means engages and biases the roller along substantially its full length so that the resilient biasing means is also of significant length in practice. Alternatively each spring may comprise a set of aligned shorter spring elements. A cantilever spring is particularly suitable because it can be made to any chosen length and have a profile to match the space available and to provide the spring force required.

Preferably, the high frequency torsional oscillation mitigation tool is releasably connected to the rotary steerable tool and the other parts of the downhole assembly. Preferably also the mitigation tool has a pin connector at its uphole end and a box connector at its downhole end, the pin and box connectors being of standard form to mate with neighbouring components having cooperating connectors. The box connector of the mitigation tool may be connected directly to the pin connector of a rotary steerable tool, or alternatively to an additional downhole component such as a stabiliser, or measurement while drilling (MWD) or logging while drilling (LWD) equipment comprised in the downhole assembly.

Desirably, the first connector is rigidly (and perhaps integrally) connected to a body forming a tubular shaft of the mitigation tool, and the second connector is rigidly (and perhaps integrally) connected to a sleeve surrounding at least part of the central tubular shaft. The one-way coupling preferably acts between the shaft and the sleeve, i.e. the relatively rotatable components of the one-way coupling are separated in a radial direction. It is preferable to have the relatively-rotatable components separated radially rather than longitudinally (for example) so that they do not need to withstand the significant forces providing the weight on bit.

There is also provided a high frequency torsional oscillation mitigation tool configured for use in a downhole assembly, the high frequency torsional oscillation mitigation tool having a first end, a second end, and a one-way coupling between the first end and the second end, the tool having a first connector at the first end and a second connector at the second end, the first and second connectors being configured for releasable connection to other downhole components in use, the one-way coupling having a first part and a second part, the first part being connected to rotate with the first connector and the second part being connected to rotate with the second connector, the one way coupling having an engaged condition in which the first part and the second part can rotate together and a disengaged condition in which the first part can rotate relative to the second part.

Desirably the first connector and the second connector are each a pin connector or a box connector, suitably of standard form for the downhole assembly. Thus, the mitigation tool can have a pin connector at its uphole end and a box connector at its downhole end in use (or vice versa). Alternatively, the mitigation tool can have a pin connector at its first and second ends, or a box connector at its first and second ends, the connections being provided as required for connection to the other parts of the downhole assembly.

Preferably, the high frequency torsional oscillation tool has a tubular shaft, desirably a central tubular shaft, and a surrounding sleeve, the shaft being rigidly connected to the first connector at the first end and the sleeve being rigidly connected to the second connector at the second end.

It will be understood that the mitigation tool is designed to transmit the normal (clockwise) rotation of the drill string to the rotary steerable tool and drill bit, and to accommodate the torque driving that rotation. It will also be understood that there is a limit to the torque which can be accommodated, which limit depends upon many factors including the size of the tool, the material of the tool and friction effects. The tool would ordinarily be designed to transmit sufficient torque for all normal drilling operations plus a suitable overhead to allow for future increases in drilling torque and for situations in which the operator seeks to transmit excess torque beyond the tool's stated capacity.

In addition, and in common with other downhole tools, the mitigation tool will have a specified maximum survivable limit. The tool is not designed to operate at (or close to) its survivable limit but this limit is specified so that operators know how much force can be applied to the tool in extreme situations, for example to pull the tool out of the borehole if the drill bit or part of the downhole assembly below the mitigation tool becomes stuck for example due to a swollen or collapsed borehole (and when the only requirement is typically to retrieve the downhole assembly). The survivable limit usually includes separate limits for tensile pull, torsion load and the amount of bending which the tool can withstand before a catastrophic failure occurs, for example the tool breaks up downhole, which failure could prevent further drilling of the borehole.

The mitigation tool preferably includes a locking mechanism. The locking mechanism forms a part of the "survival" mechanism for retrieving the downhole assembly and does not affect or contribute to the normal operation of the mitigation tool.

In the event that the drill bit (or any part of the downhole assembly below the mitigation tool) becomes stuck in the borehole, the usual option for the operator is to pull the drill string up the borehole to seek to release the stuck component. The tension applied to the drill string will usually be significantly higher than in normal operations, and is often called "overpull". The operator may also rotate the drill string to seek to rotate the stuck component. In some cases the operator might pull and rotate the drill string at the same time. The locking mechanism utilises the overpull.

Preferably, the tubular shaft of the mitigation tool is axially movable relative to the surrounding sleeve, between a normal position and a locking position. The locking mechanism has a locked condition and an unlocked condition. It is arranged that when the shaft is in the normal position relative to the sleeve the locking mechanism is in its unlocked condition. Conversely, when the shaft is in the locking position relative to the sleeve the locking mechanism is in its locked condition. Axial movement of the shaft relative to the surrounding sleeve between the normal position and the locking position therefore transfers the locking mechanism from its unlocked condition to its locked condition.

Preferably, in the locked condition the mitigation tool communicates all of the input rotation from the drill string above the mitigation tool to output rotation of the steering tool (and drill bit) below the mitigation tool. The locking mechanism in its locked condition thereby provides a rigid connection between the uphole and downhole ends of the mitigation tool and effectively bypasses or overrides the one-way coupling. The torque which the mitigation tool can accommodate in its locked condition, and which can be utilised to release a stuck tool, is therefore determined by the locking mechanism. That torque can far exceed the normal torque required to be transmitted by the one-way coupling. The locking mechanism can therefore provide a predetermined torque capability to match the requirements of the particular drilling operation, and in particular to determine the survival limit of the torque capacity for the downhole assembly.

Desirably, the locking mechanism comprises cooperating sets of gears, preferably dog gears (or castellations). Desirably also one set of gears is rigidly connected to (or integral with) the shaft of the mitigation tool and the other set of gears is rigidly connected to (or integral with) the sleeve. The gears are normally separated to permit relative rotation of the shaft and sleeve for the one-way coupling to operate as required. The gears can, however, be brought together to lock the shaft and sleeve together.

In the event that the locking mechanism also fails (for example the operator applies more torque than the mechanism can withstand, parts of the cooperating gears will break or shear. The maximum torque capacity of the locking mechanism is determined by the number and size of the gears, and the material from which they are made. In the event that the locking mechanism fails because too much torque has been applied, it is relatively easy for the operator to determine that after the event, and therefore to understand why the tool failed.

Preferably, the locking mechanism has a resilient biasing means to bias the locking mechanism to its unlocked condition. The resilient biasing means is typically a very strong spring which maintains the locking mechanism in its unlocked condition unless an overpull is applied to the drill string. The tension required to overcome the spring and lock the mechanism can therefore be predetermined and specified. The resilient biasing means is preferably a stack of disc springs, but could alternatively be a wire wound compression spring or a machined spring for example.

The gears are preferably tapering or sloping to encourage them to mesh together as the locking mechanism moves to its locking condition.

The resilient bias means allows the locking mechanism to move to its unlocked condition when the overpull is released. Thus, it may be possible for the operator to resume drilling once the stuck component has been released and it is desirable that the one-way coupling can automatically return to operation without having to bring the downhole assembly to the surface.

Preferable and desirable features which are described for the mitigation tool when part of the downhole assembly can also be used in the mitigation tool itself where compatible (and vice versa).

BRIEF DESCRIPTION OF THE PREFERRED EMBODIMENTS

The invention will now be described in more detail, by way of example, with reference to the accompanying drawings, in which.

DETAILED DESCRIPTION

Figure 1:
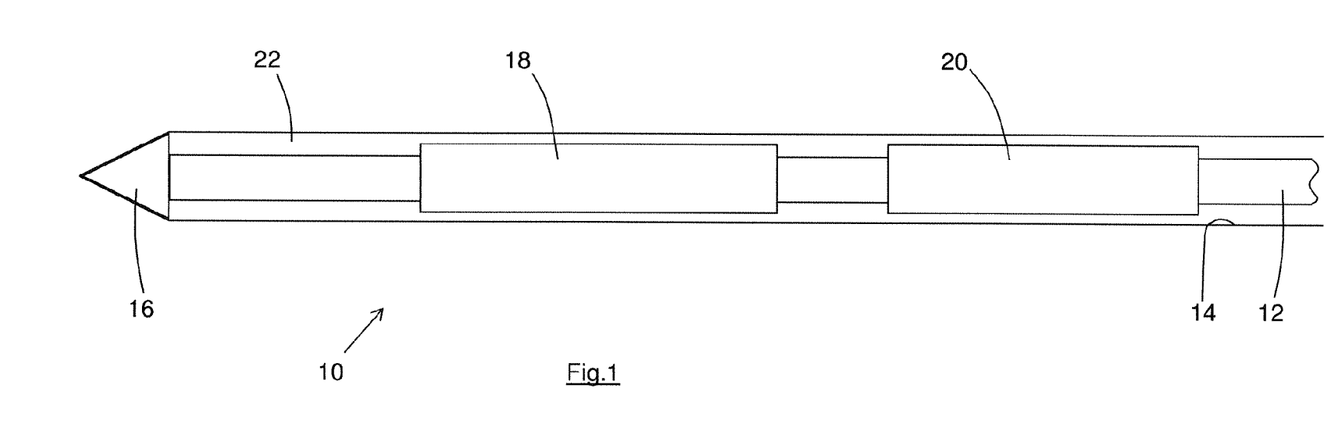
FIG. 1 shows a schematic representation of a downhole assembly according to the invention, connected to a drill string.

FIG. 1 shows a schematic representation of a downhole assembly 10 connected to a drill string 12 in a borehole 14. The downhole assembly comprises a drill bit 16, a rotary steerable tool 18 and a high frequency torsional oscillation mitigation tool 20. In FIG. 1 the borehole 14 is shown to be horizontal but that is not necessarily the case and the borehole could alternatively be vertical or at another angle.

In known fashion, the drill string 12 is connected to surface equipment (not shown), the surface equipment including means to rotate the drill string 12 and drill bit 16 in use. The drill string 12 is hollow whereby drilling fluid (mud) can be pumped down the borehole, the mud acting to lubricate the drill bit 16 and to carry drill cuttings back to the surface. The mud and entrained drill cuttings return to the surface along the annulus 22 surrounding the drill string.

In certain applications the downhole assembly may also contain a downhole (mud) motor which can provide at least some of the rotational force to the bit. The tool 20 may be located above or below the motor as desired.

A number of stabilizers will typically be provided along the length of the drill string 12 to centralise the drill string in the borehole 14. There may also be a "near-bit" stabilizer between the drill bit 16 and the rotary steerable tool 18 if desired, and perhaps also a stabilizer between the rotary steerable tool 18 and the high frequency torsional oscillation mitigation tool 20. It is expected, however, that in most applications the high-frequency torsional oscillation mitigation tool 20 will be connected directly to the rotary steerable tool 18 and/or any additional measurement while drilling (MWD) or logging while drilling (LWD) equipment comprised in the downhole assembly.

The rotary steerable tool 18 may be constructed according to EP 1 024 245, although the invention is not limited to any particular rotary steerable tool. As above described, a rotary steerable tool can steer the drill bit 18 in a desired direction by forcing the rotating drill string away from the centre of the borehole 14 in a chosen direction.

The components which extend from the rotary steerable tool 18 to engage the borehole 14 and force the drill string 12 away from the centre of the borehole are not shown in FIG. 1 for simplicity (and because the many different specific componentries will be well-known to a skilled person).

The high frequency torsional oscillation mitigation tool 20 can carry stabilizer blades to centralise it in the borehole if desired. Alternatively, its radial position is determined by the rotary steerable tool 18, and/or by a stabilizer above (or below) the mitigation tool 20. It may in certain applications be desirable for the tool to carry stabilizer blades (or otherwise engage the borehole) as any surface of the tool which rubs against the borehole surface in use provides a frictional contact which causes drag and dissipates energy in the form of heat.

As above indicated, if desired the downhole assembly can include two high frequency torsional oscillation mitigation tools 20, i.e. with another tool 20 between the drill bit 16 and the rotary steerable tool 18.

Detailed structures of six embodiments of a high frequency torsional oscillation mitigation tool 120, 220, 320, 420, 520 and 620 are shown in the Figures; it will be understood that these embodiments are representative of the many different detailed structures which are encompassed by the present invention. All of the embodiments are represented in an orientation corresponding to that of FIG. 1, i.e. with the uphole end to the right and the downhole end to the left as drawn. It will be understood, however, that the orientation could be reversed without detriment to the invention. Also, whilst a pin connector is shown at the uphole end and a box connector is shown at the downhole end of each embodiment, the connector arrangement could be reversed, or alternatively the tool could have two pin connectors or two box connectors, as required in a particular application to connect to the other downhole components.

Figure 2:
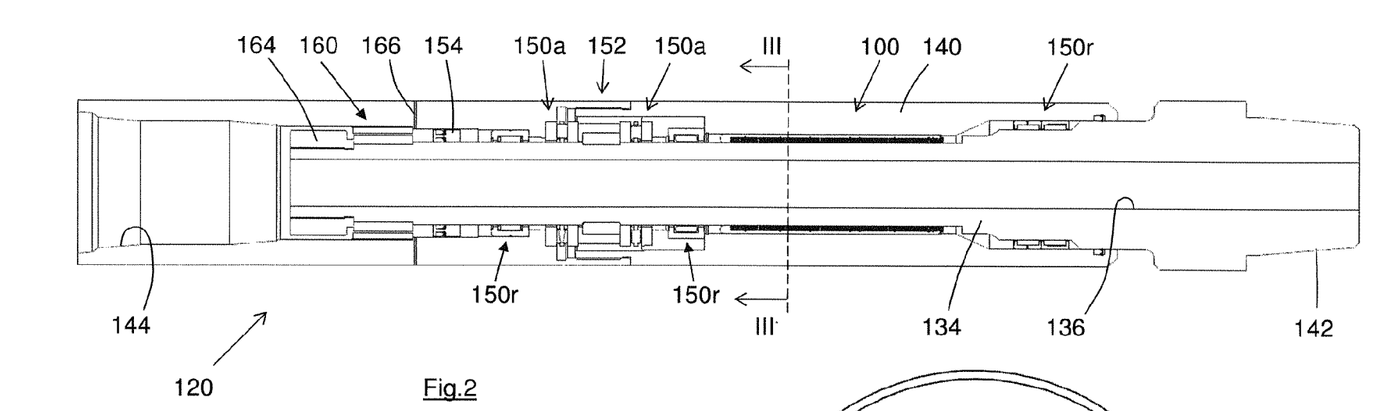
FIG. 2 shows a longitudinal sectional view of a first embodiment of high frequency torsional oscillation mitigation tool according to the invention.
Figure 3:
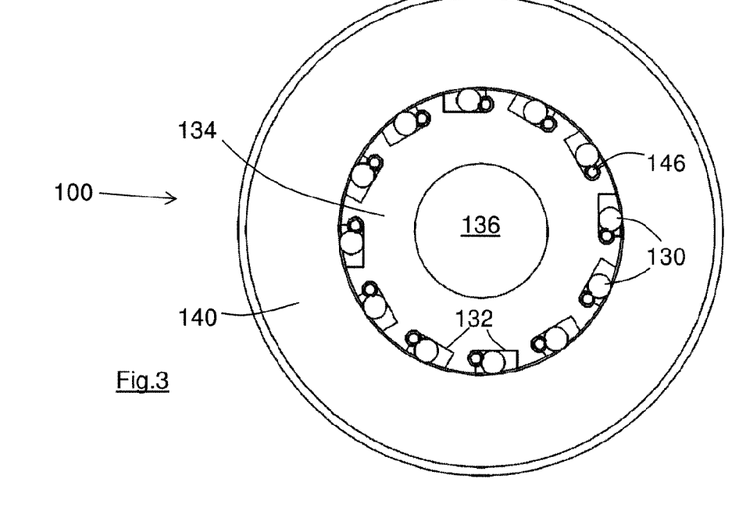
FIG. 3 shows a cross-section at III-III of the tool of FIG. 2.

The high frequency torsional oscillation mitigation tool 120 of FIGS. 2 and 3 incorporates a freewheel clutch 100 as the one-way coupling. The freewheel clutch 100 comprises a number of rollers 130 of circular cross-section, each of which is located in an inclined recess 132 in the body or central shaft 134 of the tool. The central shaft 134 is tubular and has an internal conduit 136 by which the mud can flow to the drill bit 16. The shaft 134 is closely surrounded by a sleeve 140. There is a small radial gap between the shaft 134 and the sleeve 140 which is provided to minimise any sliding contact during relative rotation of the shaft and sleeve.

The recesses 132 are inclined from a radially deeper end to a radially shallower end (the rollers 130 are all located at the deeper end of their respective recess in FIG. 3). The incline in this embodiment is curved and concave but could alternatively be linear or curved and convex. It is arranged that the distance between the deeper end of each recess 132 and the sleeve 140 is slightly greater than the diameter of the rollers 130 whereas the distance between the shallower end of each recess 132 and the sleeve 140 is slightly smaller than the diameter of the rollers 130. Accordingly, when the shaft 134 rotates clockwise as viewed in FIG. 3, each roller is urged up the incline of its recess 132 towards the shallower end and moves into engagement with the sleeve 140. It is arranged that the engagement of all of the rollers 130 with the sleeve 140 is sufficient to lock the sleeve 140 to the shaft 134 so that both components rotate together (i.e. the one-way coupling 100 is engaged).

It will be appreciated that the torque to rotate the drill bit is significant and the rollers 130 must accommodate that torque when locked to the sleeve 140, ideally without any relative rotation. The number and diameter of the rollers 130 is limited by the radial space within which the shaft 134 and sleeve 140 must be accommodated. The axial length is not so limited, however, and in order to accommodate the torque the rollers 130 are typically of significant length, perhaps 400 mm to 600 mm in a typical application.

The uphole pin connector 142 is connected rigidly to the shaft 134 (and in this embodiment is integral with the shaft 134). The downhole box connector 144 is rigidly connected to the surrounding sleeve 140 so that clockwise rotation of the shaft 134 as viewed in FIG. 3 (i.e. in the first direction) is communicated from the drill string 12 (or motor) to the rotary steerable tool 18 and the drill bit 16.

A resilient biasing means 146 is located in each of the recesses 132 to bias the rollers 130 up the incline of the recess 132, i.e. to help to ensure that the one-way coupling 100 is locked against relative rotation in the first direction. The resilient biasing means minimise backlash and enable the rollers to lock in the engaged condition quickly.

Figure 4:
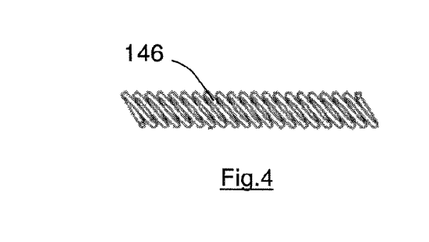
FIG. 4 shows a side view of part of the resilient biasing means of the tool of FIGS. 2 and 3.
Figure 11:
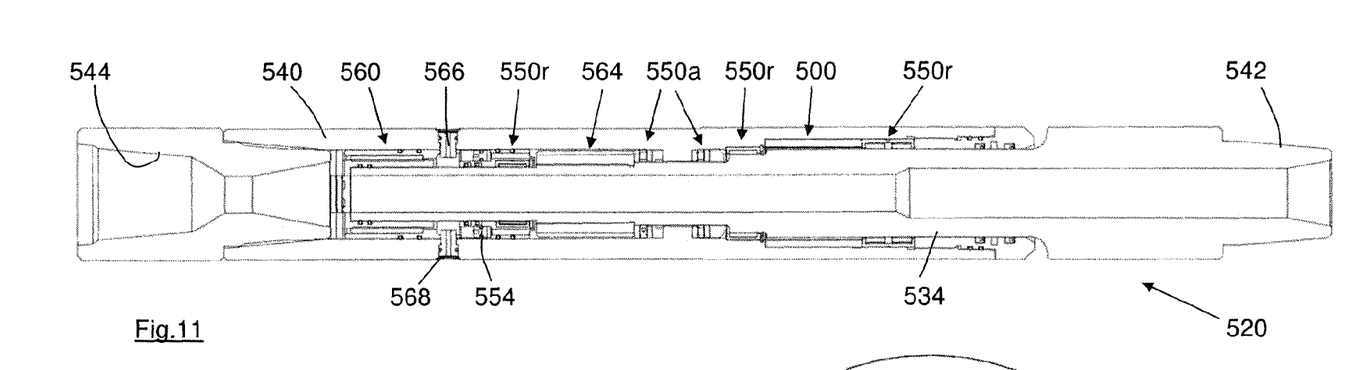
FIG. 11 shows a longitudinal sectional view of a fifth embodiment of high frequency torsional oscillation mitigation tool according to the invention.
Figure 12:
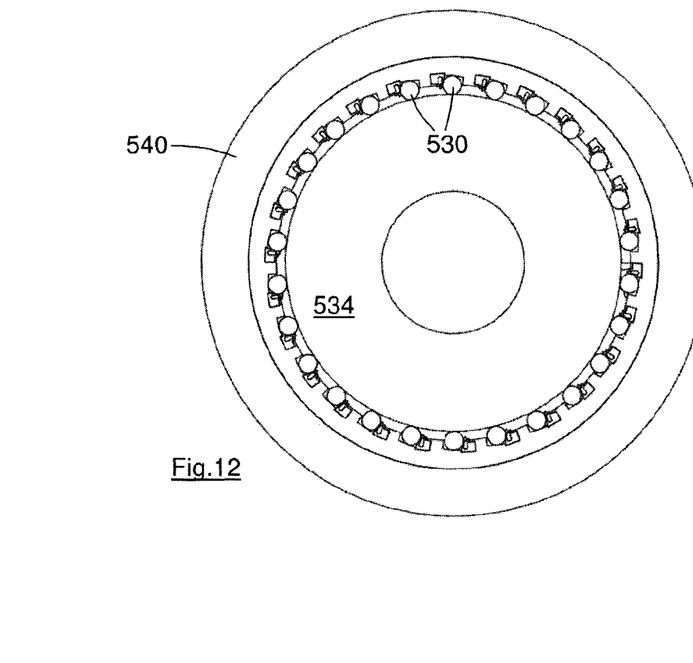
FIG. 12 shows a cross-section of the one-way coupling of the tool of FIG. 11.
Figure 13:
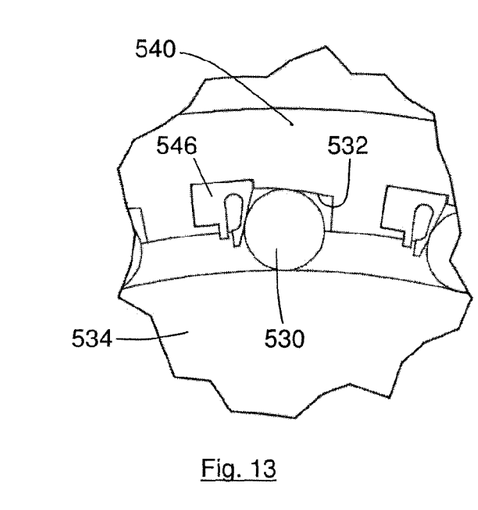
FIG. 13 shows an enlarged view of part of the cross-section of FIG. 12.

FIG. 4 shows a side view of part of one embodiment of resilient biasing means 146, specifically a canted spring of metal. It will be understood that the canted spring can be flattened somewhat from the condition shown (i.e. compressed in the direction towards the bottom of the page) and will seek to return to the unstressed condition. It will also be understood that the canted spring can be made in any length, and in practical applications may substantially match the length of the rollers 130). Other resilient biasing means can alternatively be provided, including for example a folded metal (accordion) spring, or an elastomeric rod. Another alternative is a cantilever spring as shown in the embodiment of FIGS. 11-13, which could be used in the present embodiment instead of the canted spring (and vice versa).

When the shaft 134 rotates anti-clockwise as viewed in FIG. 3, each roller 130 is urged down the incline of its recess 132 towards the deeper end (with a force sufficient to overcome the resilient biasing means 146). The rollers 130 move out of engagement with the sleeve 140 and the sleeve does not rotate with the shaft 134. Relative rotation of the drill string 12 in this (second) direction is therefore not communicated to the rotary steerable tool 18 and the one-way coupling 100 is disengaged.

It is arranged that the one-way coupling is engaged during normal operation of the downhole assembly 10, i.e. with the drill string 12 rotating clockwise when viewed downhole towards the drill bit. The shaft 134 rotates with the drill string 12 in this first direction to communicate normal drilling rotation to the drill bit. Normal drilling rotation is also communicated to the rotary steerable tool 18 to permit the drill bit 16 to be steered in a chosen direction.

In the presence of high frequency torsional oscillation, the downhole assembly and part of the drill string will oscillate rapidly clockwise and anticlockwise at the resonant frequency/frequencies. During periods of reverse rotation (i.e. with the shaft 134 rotating anti-clockwise relative to the sleeve 140), the one-way coupling 100 disengages so that minimal torque and energy transfer occurs and subsequently the release of energy back into the downhole assembly (as part of the natural resonance phenomena) is reduced or prevented. The likelihood of damage to the downhole assembly is thereby reduced, which furthermore reduces the likelihood that damaging high frequency torsional oscillations will build up in the drill string 12.

The mitigation tool 120 of FIGS. 2 and 3 has two sets of axial bearings 150a and two sets of radial bearings 150r, one of each set to each side of a joint 152 of the tool housing. The joint 152 rigidly connects an end cap (which includes the sleeve 140) to the box connector 144 and is necessary for assembly of this embodiment of mitigation tool 120.

The sets of bearings 150a,r, and also the one-way coupling 100, are lubricated by oil which is isolated from the surrounding mud. A pressure equaliser or compensator 154 is provided, which can slide to balance the pressure of the oil with that of the surrounding mud, in known fashion. Other compensation systems could alternatively be used, e.g. a bladder or an array of smaller axial pistons in the toroidal space occupied by the illustrated balance piston.

The mitigation tool 120 also has a mud flow restrictor as is common to downhole tools which are lubricated by oil. It will be appreciated that the pressure of the mud within the internal conduit 136 (i.e. upstream of the drill bit 16) is significantly greater than the pressure of the mud in the annulus 22 surrounding the tool (i.e. downstream of the drill bit). The tool necessarily includes seals to separate the mud from the oil lubricant and it is preferable that the seals are not required to withstand the pressure differential between the internal conduit 136 and the annulus 22. The mud flow restrictor is provided to reduce the pressure differential across the relevant parts of the tool and thereby reduce the likelihood of a seal failure.

It will be seen that mud can pass around the outside of an end nut 164 adjacent to the box connector 144. The mud flow restrictor 160 is located between the end nut 164 and a conduit 166. The restrictor 160 and conduit 166 together provide a controlled mud leak path from the internal conduit 136 to the annulus 22. The compensator 154 is located adjacent to the conduit 166 and the mud pressure upon the compensator is therefore approximately the same as the pressure in the annulus 22. The pressure of the lubricating oil can therefore be compensated to the annulus pressure, in known fashion. The mud flow restrictor 160, which in this embodiment comprises an inner and outer ring with a very small clearance, is used to manage the pressure drop and flow rate of the mud, in a similar fashion to a mud lubricated radial bearing.

Figure 7:
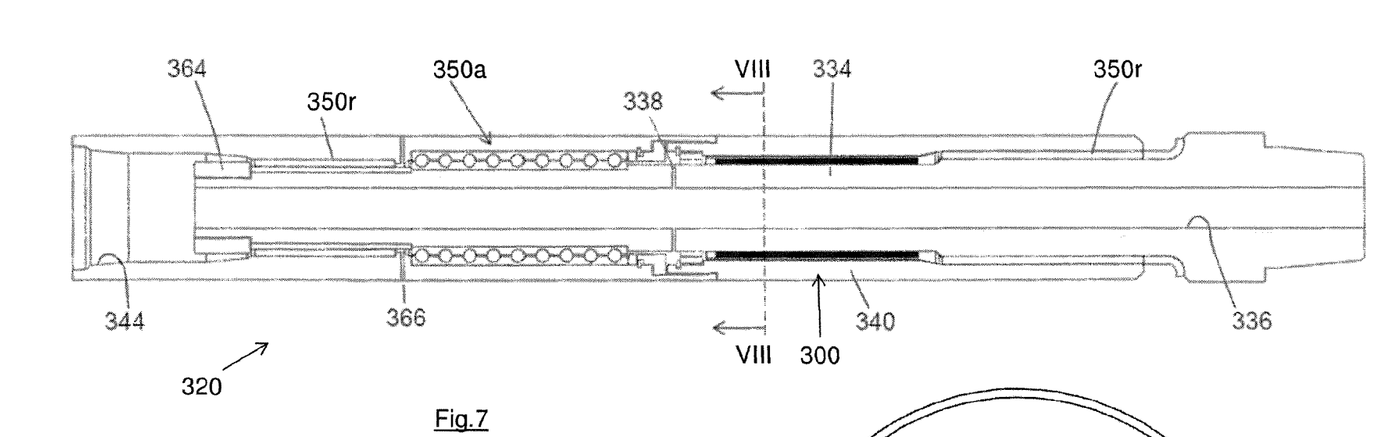
FIG. 7 shows a longitudinal sectional view of a third embodiment of high frequency torsional oscillation mitigation tool according to the invention.
Figure 8:
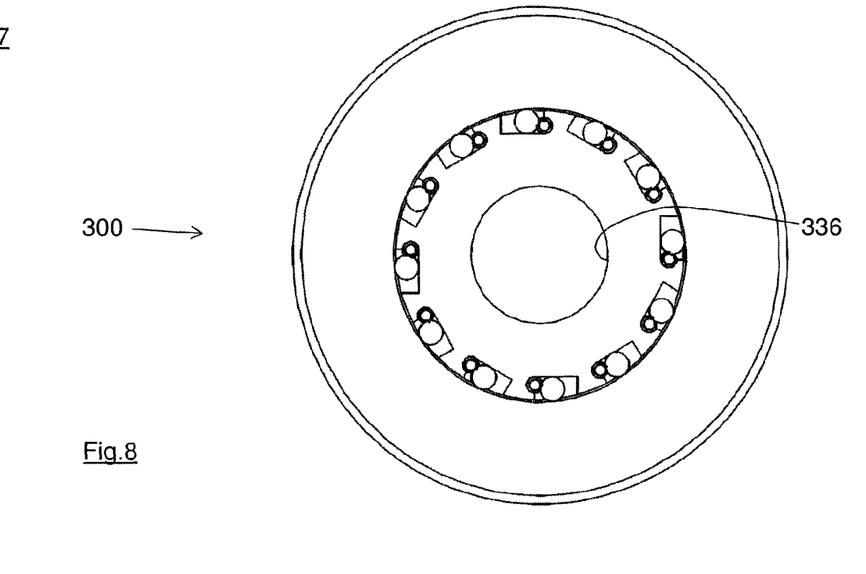
FIG. 8 shows a cross-section at VIII-VIII of the tool of FIG. 7.

It will be observed that in the embodiment of FIGS. 2-4 the recesses 132 are formed in the shaft 134 (and similarly in the embodiment of FIGS. 7-8). The embodiment of FIGS. 11-13 shows the opposite arrangement in which the recesses are formed in the surrounding sleeve 140. The two options are interchangeable in each embodiment.

Figures 5, 6:
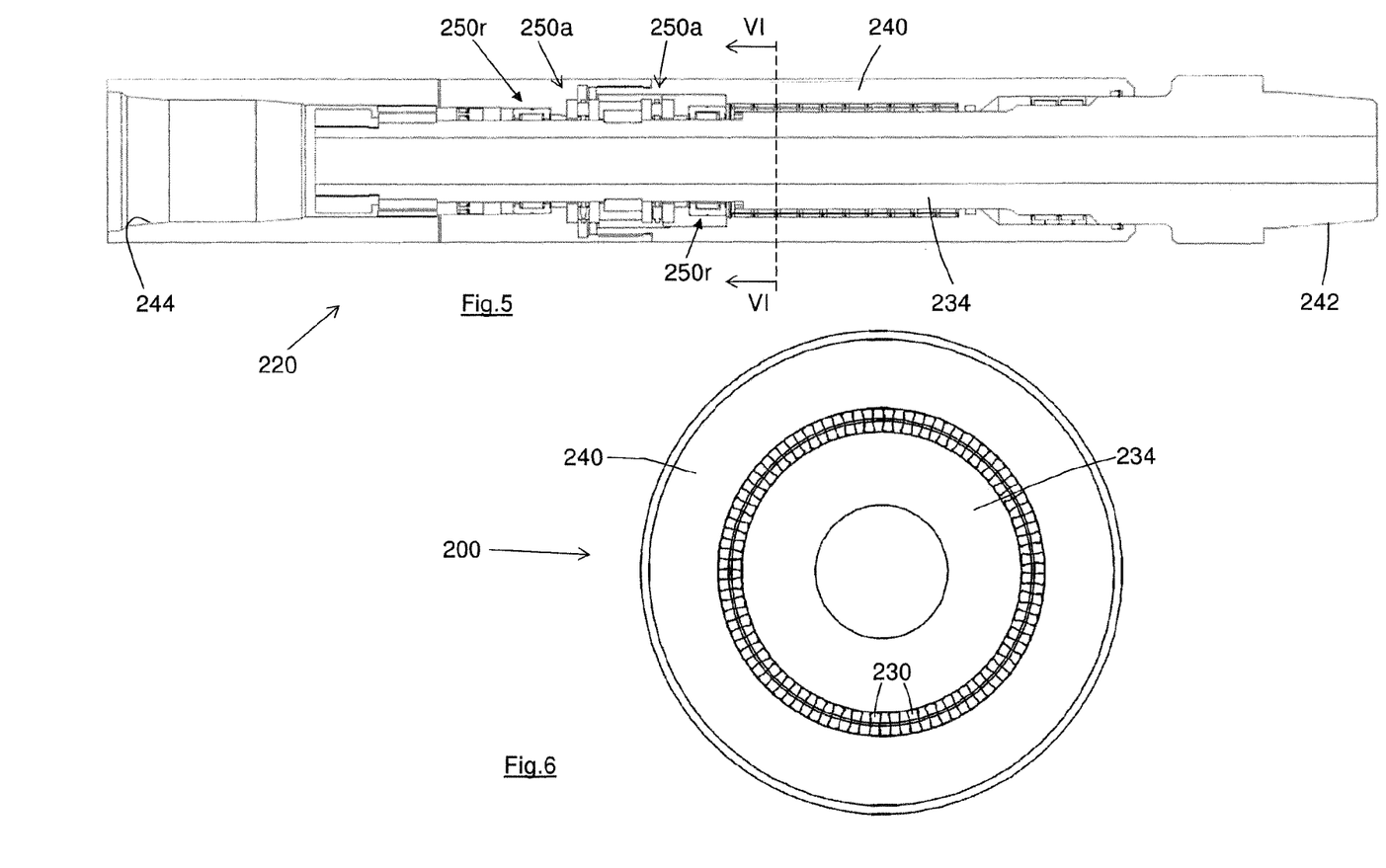
FIG. 5 shows a longitudinal sectional view of a second embodiment of high frequency torsional oscillation mitigation tool according to the invention.
FIG. 6 shows a cross-section at VI-VI of the tool of FIG. 5.

The high frequency torsional oscillation mitigation tool 220 of FIGS. 5 and 6 differs from that of FIGS. 2 and 3 in using a one-way coupling in the form of a sprag clutch, the sprag clutch and bearings being lubricated by oil which is isolated from the mud. A suitable sprag clutch type is the "cage freewheel SF" available from Ringspann GmbH (see the website www.ringspann.com).

The sprag clutch 200 is shown in more detail in the cross-sectional view of FIG. 6. In known fashion, a set of sprags 230 are located in an annular gap between the shaft 234 and the sleeve 240. The sprags have a major dimension which is larger than the annular gap, and a minor dimension which is smaller than the annular gap. It will be understood that when the shaft 234 rotates relative to the sleeve in a chosen direction (in this embodiment the clockwise direction as viewed in FIG. 6), the sprags are driven to rotate so that their major axes are more closely aligned with the radial direction. The sprags 230 become wedged between the shaft 234 and sleeve 240 and can transmit torque from the shaft 234 to the sleeve 240. Relative rotation in the opposing direction, however (corresponding to anti-clockwise rotation of the shaft 234 as viewed in FIG. 6) causes the individual sprags 230 to rotate so that their major axes are less closely aligned with the radial direction (i.e. the sprags 230 rotate to an orientation with a smaller radial dimension). The sprags 230 will no longer be in driving contact with the shaft and/or sleeve and the sleeve 234 can rotate relative to the shaft 240. It will be seen that in this embodiment the uphole pin connector 242 is rigidly connected to the shaft 234 whereas the downhole box connector 244 is rigidly connected to the sleeve 240.

The embodiment of FIGS. 5 and 6 also uses sets of axial and radial bearings 250a,r. In this embodiment each set of bearings comprises needle roller bearings 250r for radial support, but could alternatively use plain bearings, or a combination thereof.

The detailed operation of the tool 220 of FIGS. 5 and 6 matches that of the tool 120 and will not be repeated.

The high frequency torsional oscillation mitigation tool 320 of FIGS. 7 and 8 differs from the embodiment of FIGS. 2 and 3 in using mud to lubricate the one-way coupling and the bearing structures.

The tool 320 has an internal conduit 336 for the passage of mud from the surface to the drill bit 16. Inlet conduits 338 connect the internal conduit 336 to a location between the one-way coupling 300 and the axial bearings 350a. The mud pressure differential between the internal conduit 336 and the annulus 22 causes some of the mud to flow from the inlet conduit 338 in an uphole direction past the one-way coupling 300 and the upper radial bearing 350r before passing to the annulus 22 surrounding the tool. The remainder flows in a downhole direction through the axial bearing 350a and out of the tool by way of the outlet conduits 366.

Mud also flows from the internal conduit 336 around an end nut 364 located at the box connector 344, past the lower radial bearing 350r and out to the annulus 22 through the outlet conduits 366.

Accordingly, a small proportion (typically between approx. 1% and approx. 5%) of the mud flowing along the internal conduit 336 is diverted to lubricate the one-way coupling 300 and the bearings 350a,r of the tool 320.

As seen in FIG. 8, in this embodiment the one-way coupling 300 is similar to that of the embodiment of FIGS. 2 and 3 but that is not necessarily the case and other embodiments can utilise different one-way couplings suitable for a mud-lubricated system.

Figure 9:
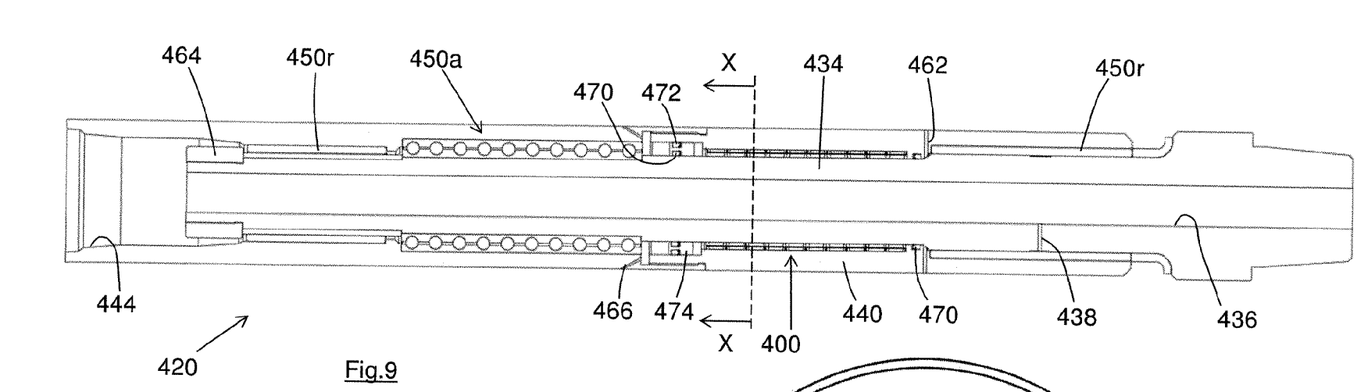
FIG. 9 shows a longitudinal sectional view of a fourth embodiment of high frequency torsional oscillation mitigation tool according to the invention.
Figure 10:
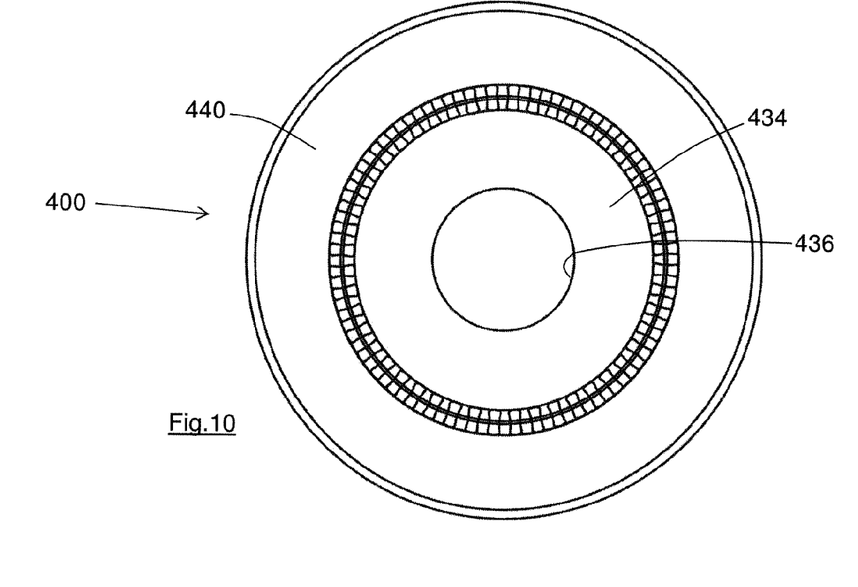
FIG. 10 shows a cross-section at X-X of the tool of FIG. 9.

The high frequency torsional oscillation mitigation tool 420 of FIGS. 9 and 10 differs from the embodiment of FIGS. 4 and 5 primarily in using mud to lubricate the bearing structures. Oil is used to lubricate the sprag clutch 400 as in the embodiment of FIGS. 5 and 6.

The tool 420 has an internal conduit 436 for the passage of mud from the surface to the drill bit 16. An inlet conduit 438 connects the internal conduit 436 to an upper radial bearing 450r. Some of this mud passes in an uphole direction to the annulus 22. The remainder passes in a downhole direction to outlet conduits 462 which allow the mud to flow into the annulus 22

Mud can also flow from the internal conduit 436 around an end nut 464 located at the box connector 444, through the lower radial bearing 450r and the axial bearing 450a. This mud lubricates the bearings 450r and 450a and passes through outlet conduits 466 to the surrounding annulus 22.

Accordingly, a small proportion of the mud flowing along the internal conduit 436 is diverted to lubricate the radial bearings 450r and the axial bearings 450a. The radial bearing 450r also acts as a mud flow restrictor so that the mud pressure acting upon the compensator 474 is close to that of the annulus 22.

The one-way coupling (which in this embodiment is a sprag clutch 400) is isolated from the mud by a combination of rotating seals 470 and static seals 472 and by the pressure compensator 474.

FIGS. 11-13 shown another alternative embodiment of mitigation tool 520 according to the invention.

In this embodiment the recesses 532 are formed in the sleeve 540. The rollers 530 therefore move inwardly towards the shaft 534 to the engaged condition (and outwardly to the disengaged condition), as compared to the earlier embodiments. For a given tool diameter the recesses 532 and rollers 530 can therefore be located at a slightly greater radius, and spread over a slightly greater circumferential length, which can permit an increase in the number of rollers 530.

The resilient biasing means in this embodiment is a cantilever spring 546, the profile of which can be better seen in the enlarged view of FIG. 13. Each cantilever spring 546 sits in a pocket of the recess 532 and biases the roller 530 towards the shallower end of the recess.

The detailed form of the cantilever spring 546 can be varied from that shown to suit the particular application. It will be understood that it is only necessary for the tool manufacturer to determine a suitable profile and material for the cantilever springs 546 and they can be made to any required length, ideally to match the full length of the rollers 530.

It will be understood that the general form of the recesses 532 and the general operation of the rollers 530, are as described previously and will not be repeated.

The arrangement of the components of the mitigation tool 520 are modified somewhat as compared to the embodiment of FIGS. 2 and 3, which in certain applications can make the tool easier to manufacture and assemble/disassemble. The modifications can also make the tool more durable and reliable. The modifications are all optional and are shown to demonstrate some of the variety of options for the detailed structure which can be utilised in practice.

The mitigation tool 520 of FIGS. 11-13 has two sets of axial bearings 550a and three sets of radial bearings 550r. The sets of bearings 550a,r and the one-way coupling 500 are lubricated by oil which is isolated from the surrounding mud.

The mitigation tool 520 has a mud flow restrictor 560 and "leak" conduits 566. In this embodiment the conduits 566 are provided by a component 568 which is secured in the sleeve 540. The components 568 are of hardened steel or tungsten carbide and are removable; the components 568 can therefore be replaced when they become eroded due to mud flow through the conduits 566.

The compensator 554 is located adjacent to the components 568.

The securing nut 564 by which the sleeve 540 is secured to the shaft 542 is located inwardly of the compensator 554.

FIGS. 14-18 show a further modified mitigation tool 620 with additional (optional) functionality. Specifically, this embodiment has a locking mechanism in addition to the one-way coupling, which locking mechanism might be required for example if the drill bit or another part of the downhole assembly becomes stuck in the borehole.

It is not intended that the locking mechanism is actuated during normal operation, and it is expected that in many drilling operations the locking mechanism will never be required and the mitigation tool will operate as above described. However, in the event that the drill bit or another part of the downhole assembly becomes stuck the operator may wish to impart more torque to the drill string than the one-way coupling can accommodate, and the locking mechanism provides a predetermined torque capacity which can be significantly greater than that of the one-way coupling.

Figure 14:
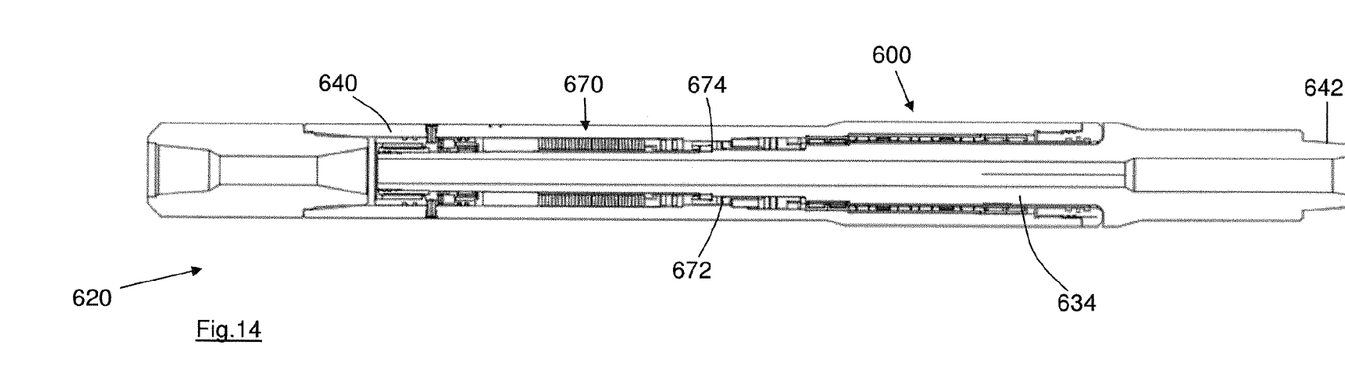
FIG. 14 shows a longitudinal sectional view of a sixth embodiment of high frequency torsional oscillation mitigation tool according to the invention.

The mitigation tool 620 includes a one-way coupling 600, and which can correspond to the detailed structure of any of the embodiments described above. The one-way coupling 600 and its associated bearings, seals etc. can therefore be similar to any of the earlier embodiments and a detailed description of that part of the tool 620 will not be repeated. The difference with the previous mitigation tools is, however, that the tool, and in particular the one-way coupling, can accommodate axial movement of the central shaft 634 relative to the surrounding sleeve 640. The relative axial movement does not need to be large, and a range of relative axial movement of 6 mm to 15 mm is expected to be sufficient for most tools (and depending upon the size of the tool).

Alongside the one-way coupling 600 the tool 620 has resilient biasing means in the form of a stack of disc springs 670. The disc springs 670 bias the central shaft 634 axially relative to the sleeve 640, to a normal (unlocked) condition. The disc springs 670 are sufficiently strong that during normal drilling operations, and proper operation of the mitigation tool 620, the shaft 634 does not move axially relative to the sleeve and the locking mechanism remains unlocked.

Figure 15:
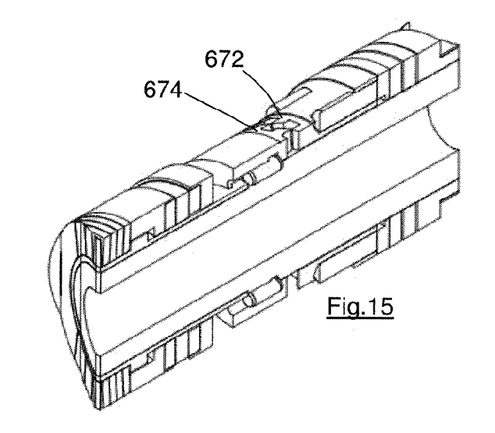
FIG. 15 shows a sectional perspective view of part of the locking mechanism of the tool of FIG. 14, in the unlocking condition.
Figure 16:
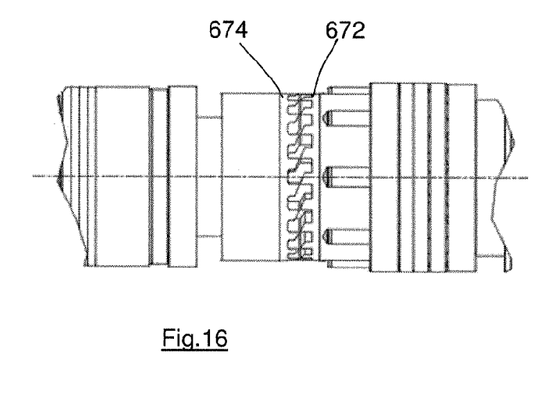
FIG. 16 shows a side view of part of the locking mechanism of the tool of FIG. 14, in the unlocking condition.

It will be seen from FIGS. 15 and 16 that the tool 620 has two pairs of aligned dog gears 672 and 674. The dog gears 672 and 674 do not engage in normal operation and in particular the springs 670 act to bias (and keep) the gears apart. The dog gears 674 are rigidly connected to the central shaft 634 and the dog gears 672 are rigidly connected to the surrounding sleeve 640. Operation of the one-way coupling 600 is therefore accompanied by relative rotation of the gears 672, 674.

In the event that a part of the downhole assembly below the mitigation tool 620 become stuck in the borehole 14, the operator will apply an overpull to the drill string 12, i.e. pulling the uphole pin connector 642 towards the right as viewed. That overpull will cause the stack of disc springs 670 to compress and the gears 672, 674 to enmesh. The gears 672 and 674 have tapered or sloping surfaces to help ensure proper meshing of the gears.

Figure 17:
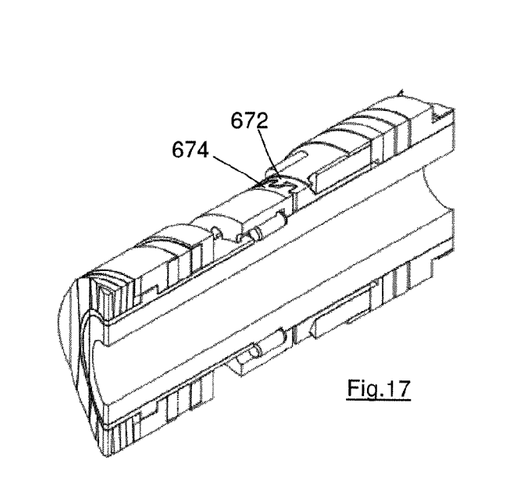
FIG. 17 shows a sectional perspective view of part of the locking mechanism of the tool of FIG. 14, in the locking condition.
Figure 18:
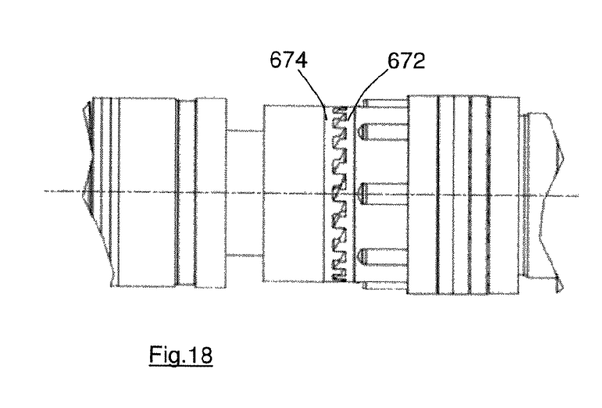
FIG. 18 shows a side view of part of the locking mechanism of the tool of FIG. 14, in the locking condition.

The tool 620 therefore moves to the condition shown in FIGS. 17-18 in which the gears 672 and 674 are meshed. In this locked condition the rotation of the drill string 12 is communicated directly from the uphole pin connector 642 to the downhole box connector 644 (and consequently to the rotary steerable tool and drill bit) and the one-way coupling 600 is overridden or bypassed. The operator can seek to release the stuck component by way of the overpull alone, or in addition by rotating the drill string 12. The locking mechanism allows the operator to apply a torque up to the limit of the dog gears 672, 674, which in practical applications will far exceed the torque which the one-way coupling 600 can withstand.

As regards the bearings used in the various embodiments, it is generally understood that ball bearing type thrust bearings are generally more suitable for the larger tolerances and clearances which are typically necessary in a mud lubricated system. Conversely, plain bearing type bushes are generally more suitable as radial bearings in mud lubricated applications. It is not excluded that the bearings of certain of the embodiments could be used in other embodiments, depending on their positions relative to the oil/mud sealing members.

It will be seen that the sets of axial or thrust bearings 150a, 250a, 350a, 450a, 550a are all located below the respective one-way couplings 100, 200, 300, 400, 500. It is possible to provide the axial bearings (or additional sets of axial bearings) above the respective one-way couplings if desired, but that is not expected to be necessary in practice.

The invention claimed is:

1. A downhole assembly including a rotary steerable tool and a high frequency torsional oscillation mitigation tool, the high frequency torsional oscillation mitigation tool having:
   a first end, a second end, and a one-way coupling between the first end and the second end,
   a first connector at the first end and a second connector at the second end, the first connector and the second connector being configured for releasable connection to other downhole components in use,
   the one-way coupling having a first part and a second part, the first part being connected to rotate with the first connector and the second part being connected to rotate with the second connector, the one-way coupling having an engaged condition in which the first part and the second part can rotate together and a disengaged condition in which the first part can rotate relative to the second part,
   the first part being a tubular shaft and the second part being a sleeve surrounding the tubular shaft,
   one of the sleeve and the tubular shaft carrying a number of rollers of circular cross-section, each roller of the number of rollers being located in a recess of the sleeve or tubular shaft respectively, each recess having a floor which is inclined from a radially shallower end to a radially deeper end, and in which the each roller projects from the recess when located at the radially shallower end,
   said each roller of the number of rollers comprising a set of aligned roller elements,
   the high frequency torsional oscillation mitigation tool being located above the rotary steerable tool.

2. The downhole assembly according to claim 1 in which the number of rollers are carried by the sleeve and are located in recesses of the sleeve.

3. The downhole assembly according to claim 1 in which the high frequency torsional oscillation mitigation tool is a first high frequency torsional oscillation mitigation tool, and in which the downhole assembly also has a second high frequency torsional oscillation mitigation tool located below the rotary steerable tool, the second high frequency torsional oscillation mitigation tool also having a one-way coupling.

4. The downhole assembly according to claim 1 in which the high frequency torsional oscillation mitigation tool is releasably connected directly to the rotary steerable tool.

5. The downhole assembly according to claim 1 in which the first connector is one of a pin connector and a box connector.

6. The downhole assembly according to claim 1 in which the second connector is one of a pin connector and a box connector.

7. The downhole assembly according to claim 1 in which the tubular shaft is rigidly connected to the first connector and the sleeve is rigidly connected to the second connector.

8. The downhole assembly according to claim 1 in which there is a radial gap between the tubular shaft and the sleeve, and in which said each roller of the number of rollers extends across the radial gap when located at the radially shallower end.

9. The downhole assembly according to claim 1 in which said each roller of the number of rollers is engaged by a resilient biasing means, the resilient biasing means urging the each roller towards the radially shallower end of its recess.

10. The downhole assembly according to claim 9 in which the resilient biasing means comprises a set of aligned shorter resilient biasing elements.

11. The downhole assembly according to claim 9 in which the resilient biasing means is a cantilever spring.

12. The downhole assembly according to claim 1 in which at least a part of the high frequency torsional oscillation mitigation tool is lubricated by a fluid which surrounds the high frequency torsional oscillation mitigation tool in use.

13. The downhole assembly according to claim 1 in which at least a part of the high frequency torsional oscillation mitigation tool is lubricated by oil, in which the oil is isolated from a fluid which surrounds the high frequency torsional oscillation mitigation tool in use, and in which the high frequency torsional oscillation mitigation tool has a flow path for the fluid, the flow path including a flow restrictor.

14. The downhole assembly according to claim 13 having a pressure compensator, the pressure compensator being in communication with the flow path downstream of the flow restrictor.

15. The downhole assembly according to claim 1 having a locking mechanism for the one-way coupling.

16. The downhole assembly according to claim 15 in which the locking mechanism is actuated by a tensile force which exceeds a predetermined threshold.

17. The downhole assembly according to claim 15 in which the locking mechanism has a locked condition in which a relative rotation between the first part and the second part of the one-way coupling is restricted, and an unlocked condition in which the relative rotation between the first part and the second part is permitted.

18. The downhole assembly according to claim 17 in which the locking mechanism is biased to its unlocked condition by a resilient biasing means.

19. The downhole assembly according to claim 15 in which the first part of the one-way coupling is movable axially via a relative axial movement relative to the second part of the one-way coupling, the relative axial movement transferring the locking mechanism between its unlocked and locked conditions.

20. The downhole assembly according to claim 15 in which the locking mechanism comprises a first set of gears and a cooperating second set of gears.

21. The downhole assembly according to claim 20 in which the first set of gears is rigidly connected to the first part of the one-way coupling and the cooperating second set of gears is rigidly connected to the second part of the one-way coupling.

* * * * *